(12) United States Patent
Ishikawa

(10) Patent No.: US 6,250,352 B1
(45) Date of Patent: *Jun. 26, 2001

(54) MOTORCYCLE TIRE AND METHOD OF MAKING THE SAME

(75) Inventor: Takeshi Ishikawa, Akashi (JP)

(73) Assignee: Sumitomo Rubber Industries, Ltd., Hyogo-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,961

(22) Filed: Mar. 6, 1998

(30) Foreign Application Priority Data

Mar. 7, 1997 (JP) .................................................. 9-52716

(51) Int. Cl.[7] ................................ B60C 3/00; B60C 9/02; B60C 9/18; B60C 11/00
(52) U.S. Cl. ................................ 152/209.11; 152/209.14; 152/454; 152/526; 152/538; 152/548
(58) Field of Search .................. 152/209.1, 209.11, 152/209.14, 454, 526, 538, 548; 156/110.1, 123, 128.1; 264/315; 425/28.1, 35, 36, 47

(56) References Cited

U.S. PATENT DOCUMENTS

| | | | |
|---|---|---|---|
| 3,961,657 | * 6/1976 | Chrobak | 152/454 |
| 4,037,637 | * 7/1977 | Arimura et al. | 152/454 |
| 4,147,751 | 4/1979 | Duderstadt . | |
| 4,393,912 | 7/1983 | Gouttebessis . | |
| 4,706,724 | * 11/1987 | Ohkuni et al. | 152/454 |
| 4,785,861 | * 11/1988 | Fujiwara | 152/454 |
| 4,976,300 | * 12/1990 | Takehara et al. | 152/209.14 |
| 5,129,802 | 7/1992 | Sergel . | |
| 5,129,973 | * 7/1992 | Suzuki | 152/454 |
| 5,656,303 | * 8/1997 | Takagi | 425/47 |
| 6,073,668 | * 6/2000 | Iwasaki et al. | 152/209.14 |

FOREIGN PATENT DOCUMENTS 0294153  12/1988  (EP) .
0820883  1/1998  (EP) .

OTHER PUBLICATIONS

Patent Abstracts of Japan, vol. 018, No. 231 (M–1599), Apr. 27, 1994 & JP 06 024207 A (Sumitomo Rubber Ind Ltd), Feb. 1, 1994 *Abstract; Figures 1, 2*.
Patent Abstracts of Japan, vol. 010, No. 163 (M–487), Jun. 11, 1986 & JP 61 016105 A (Sumitomo Gomu Kogyo KK), Jan. 24, 1986 *Abstract; Figure 1*.

* cited by examiner

Primary Examiner—Steven D. Maki

(57) ABSTRACT

A motorcycle tire comprises a tread portion curved convexly such that the maximum cross section width TW of the tire lies between the tread edges, a carcass ply of cords arranged radially at an angle of 70 to 90 degrees to the tire equator, and a belt ply of at least one cord laid at an angle of 0 to 35 degrees disposed radially outside the carcass ply in the tread portion. When the tire is mounted on a standard rim and inflated from 10% of a standard inner pressure to 100% thereof, the tread portion swells such that the amount of swelling is larger in a shoulder region than a crown region of the tread portion. The carcass cord tension Tcs in the shoulder region is 2.0 to 3.8 times the carcass cord tension Tcc in the crown region, and the belt cord tension Tbs in the shoulder region is 1.2 to 2.0 times the belt cord tension Tbc in the crown region.

4 Claims, 5 Drawing Sheets

MOTORCYCLE TIRE AND METHOD OF MAKING THE SAME

The present invention relates to a motorcycle tire and a method of making the same, more particularly an improved tire profile being capable of improving the rigidity of the tread portion.

Usually, motorcycles are tilted during cornering and a relatively large camber angle is given to the tires.

Therefore, if the rigidity of the tread shoulder regions which come into contact with the ground is low, the road grip decreases. Further, during straight running, especially high speed straight running, the convergence of tire vibrations becomes slow or worse and the straight running stability is deteriorated.

In order to increase the rigidity in the tread shoulder regions, to dispose a reinforcing cord layer in each shoulder region, to use a rigid cord material for a reinforcing cord layer in the shoulder region, and to increase the thickness of the tread rubber in the shoulder regions have been employed. However, satisfactory results can not be obtained, and further, the tire uniformity is liable to be lost and there is danger of ply separation, heat generation and the like.

It is therefore an object of the present invention to provide a motorcycle tire in which the rigidity of the tread portion is optimized to improve tire performance such as straight running stability, cornering grip and the like without disposing any additional reinforcement.

Further, it is another object of the present invention to provide a method of making such a motorcycle tire.

According to one aspect of the present invention, a motorcycle tire comprises a tread portion with a pair of tread edges, a pair of sidewall portions, a pair of bead portions with a bead core therein, a carcass ply of cords arranged radially at an angle of 70 to 90 degrees to the tire equator, a belt ply of at least one cord laid at an angle of 0 to 35 degrees disposed radially outside the carcass ply and inside the tread portion, characterize in that the tread portion has a profile such that, when the tire is mounted on a standard rim and inflated from 10% of a standard inner pressure to 100% thereof, the tread portion swells such that the amount of swelling is larger in a shoulder region than a crown region of the tread portion.

Here, the standard rim is a rim officially approved for the tire by, for example JATMA (Japan and Asia), T&RA (North America), ETRTO (Europe), STRO (Scandinavia) and the like. The standard inner pressure is the maximum air pressure for the tire officially specified by such organization.

According to another aspect of the present invention, a method of making the motorcycle tire comprises the steps of putting a raw tire in a mold and vulcanizing the tire in the mold, and the mold having a vulcanizing profile such that a bead width BW' is 15 to 45 mm wider than the rim width RW of the standard rim, a tread width TW' which is 5 to 25 mm wider than the width TW, and a tread edge height TH' which is 3 to 15 mm higher than the tread edge height TH under 100% of the standard inner pressure.

Embodiments of the present invention will now be described in detail in conjunction with the accompanying drawings.

Figure 1:
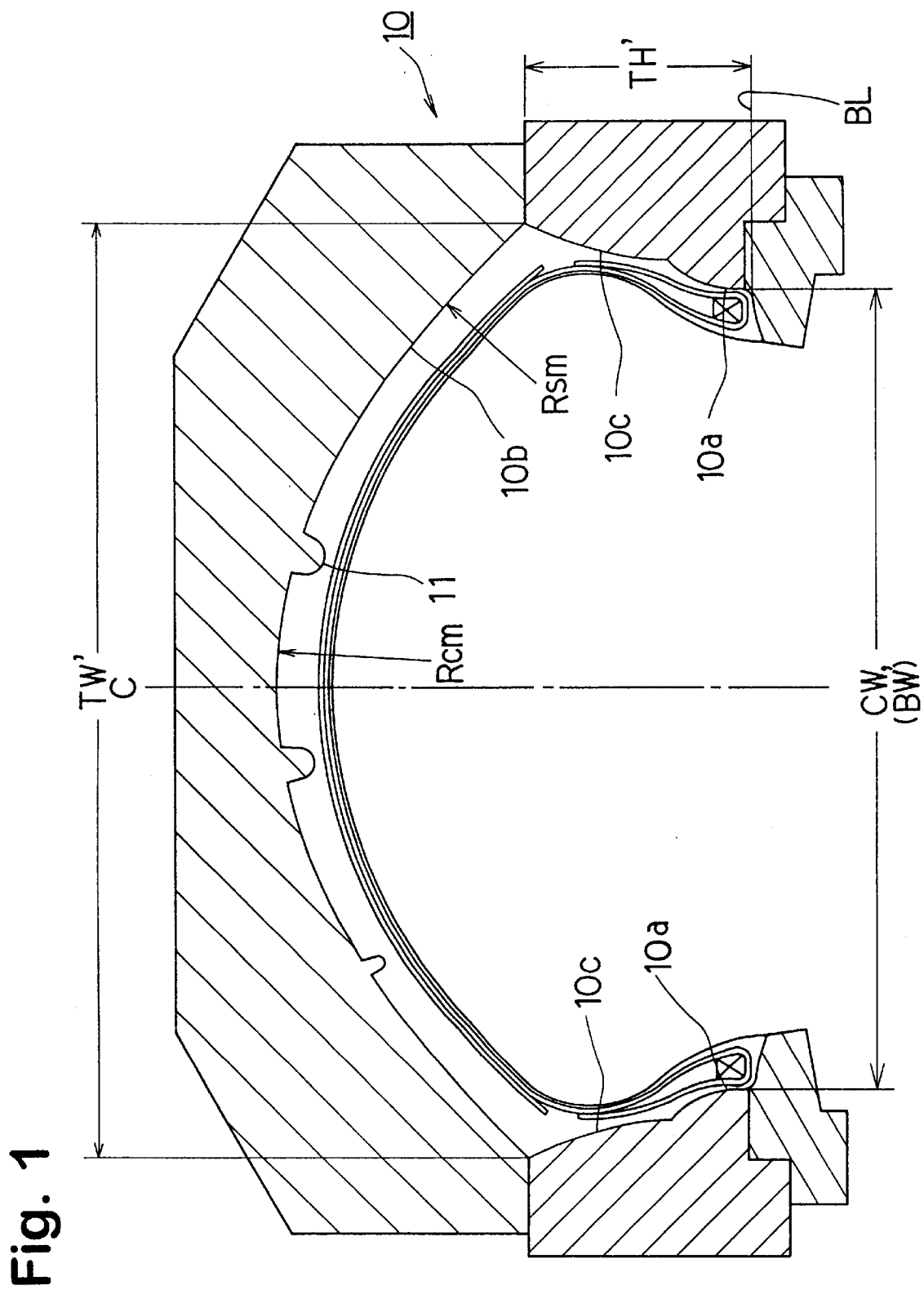
FIG. 1 is a cross sectional view of a tire according to the present invention which is disposed in a vulcanizing mold.
Figure 2:
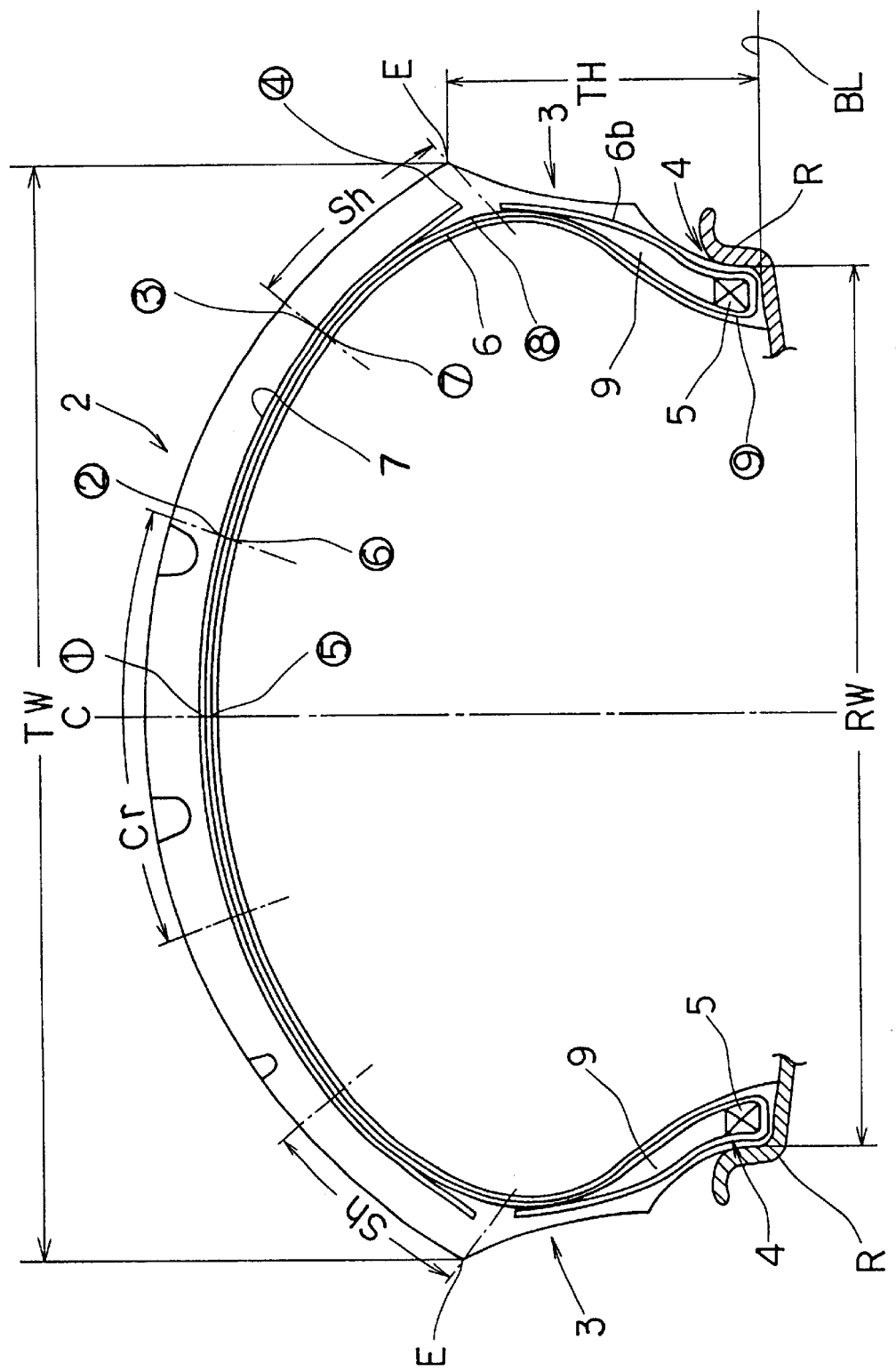
FIG. 2 is a cross sectional view of the tire which is mounted on a standard rim and inflated to a standard pressure.

First of all, an example of the internal structure of the motorcycle tire according to the invention is described, according to FIGS. 1 and 2.

The tire comprises a tread portion 2, a pair of axially spaced bead portions 4 with a bead core therein, a pair of sidewall portions 3 extending between the tread edges E and the bead portions 4, a carcass 6 extending between the bead portions 4 through the tread portion and sidewall portions, a tread reinforcing belt 7 disposed radially outside the carcass and inside a tread rubber.

The carcass 6 comprises at least one ply of cords arranged radially at an angle of from 70 to 90 degrees with respect to the tire equator. In this example, the carcass 6 consists of a single ply of nylon cords arranged at 90 degrees with respect to the tire equator C. The carcass ply is turned up around the bead core 5 in each bead portion 4 form the axially inside to outside of the tire to form a pair of turnup portions and one main portion therebetween. For the carcass cords, organic fiber cords, e.g. polyester, rayon and the like can be used. The turnup portion 6b of the carcass ply extends up to a height of not less than 80% of the tread edge height TH from the bead base line BL. Between each turnup portion and the carcass ply main portion, a hard rubber bead apex 9 extending radially outwardly from the bead core 5 is disposed to increase the rigidity of the sidewall portion.

The belt 7 is made of at least one ply of at least one cord, the cord angle of which is in the range of from 0 to 35 degrees with respect to the tire equator. In this example, the belt is made of aromatic polyamide cords which are wound spirally at a small angle of not more than 5 degrees across substantially all over the tread width. The axial width is not less than 90% of the tread width TW. The cord count is for example 50/5cm. It is possible to wind a single cord, but preferably several cords which are embedded in topping rubber in a form of ribbon or tape are wound at the same time to improve the production efficiency. Further, in addition to or instead of the above-mentioned spiral belt, it is possible to dispose a breaker belt which comprises at least two cross plies of parallel cords laid at a small angle for example 10 to 35 degrees with respect to the tire equator C. When the spiral belt is used as a radially outermost belt, the tire uniformity, high speed durability and high speed running stability can be effectively improved. On the radially outside of the belt 7, a tread rubber is disposed to define the tread portion. The tread rubber has a substantially constant thickness all over the width thereof.

Figure 4:
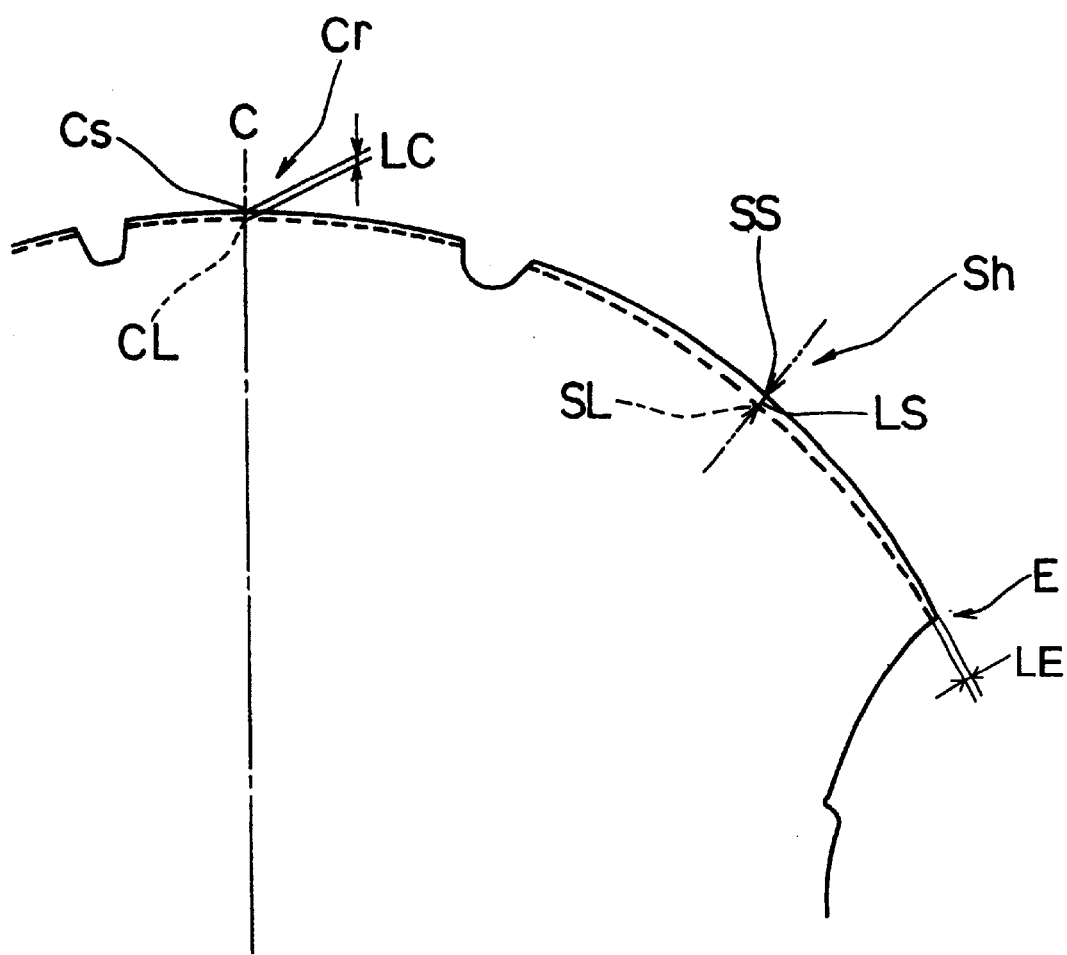
FIG. 4 is a schematic cross sectional view showing the growth of the tread portion of the tire when inflated from 10% to 100% of the standard pressure.

In contrast with the conventional tires which swell evenly throughout the tread portion, the motorcycle tire according to the present invention has a profile such that, as shown in FIG. 4, the swelling of the tread portion 2 is greater in the shoulder region Sh than the crown region Cr when the tire mounted on a standard rim R is inflated from 10% to 100% of the standard inner pressure. In FIG. 4, the dotted line shows the profile under the 10% pressure, and the solid line shows the profile under the 100% pressure. The profile under the 100% pressure is designed to be almost identical with the profile of the conventional tire under the 100% pressure. In this example, the tire size is 180/55ZR17, the standard rim size is 17XMT5.50, and the standard pressure is 2.9 kgf/sq.cm.

Accordingly, when the tire is mounted on a standard rim and inflated to a standard pressure, the carcass cords and belt cords have a larger tension in the shoulder region Sh than the crown region Cr. As a result, the tread rigidity increases in the shoulder regions Sh, and the high speed straight running stability, cornering stability, cornering grip and the like can be improved.

The above-mentioned crown region Cr is defined as a 1/3 region extending between two positions disposed one on each side of the tire equator and spaced apart from the tire equator C by 1/6 of the tread face length along the tread face. The tread face length is the length measured in the tire axial direction along the surface line of the tread portion. The shoulder regions Sh are each defined as a 1/6 region extending from one of the tread edges E to an axially inner position spaced apart from the tire equator C by 1/3 of the tread face length along the tread face.

As to the amount of swelling of the tread portion measured at the tread face normally to the tread face when the tire inner pressure increases from 10% to 100%, the amount LC at the tire equator C is about 0.8 mm in this example, the amount LE at the tread edges E is substantially equal to LC, and the amount LS at middle points is about 1.7 mm, the middle points are spaced apart from the tire equator C by 2/3 of the distance between the tire equator C and the tread edge E, along the tread surface line. The maximum swelling is occurred in the vicinity of the middle points.

Usually, LC and LE are about 0.5 to 1.1 mm, and LS is about 1.1 to 2.2 mm. As the size variation of the motorcycle tires is very little in comparison with the tires in the other categories, the limitations LC, LE and LS may be applied to almost all tire sizes.

The ratio (LS/LC) is preferably in the range of from 1.5 to 3.0, more preferably 1.5 to 2.5.

If the ratio (LS/LC) is less than 1.5, an effective increase of the rigidity in the shoulder region Sh can not be obtained. If the ratio (LS/LC) is more than 3.0, the rigidity excessively increases in the shoulder region Sh.

Therefore, as the camber angle increases, the rigidity changes abruptly to decrease the cornering stability, and a linear handling feeling can not be obtained.

Figure 5:
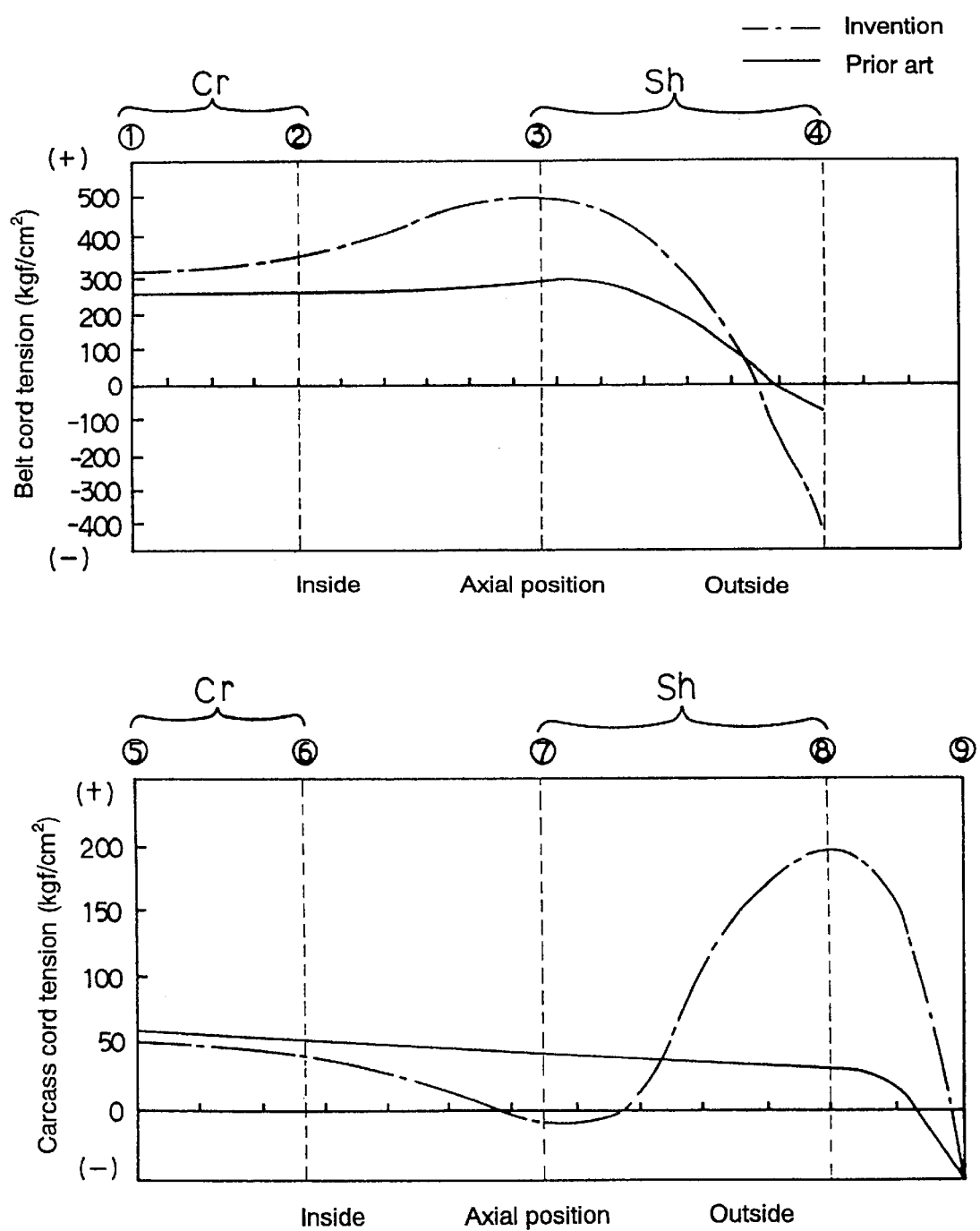
FIG. 5 is graphs showing the belt cord tension and carcass cord tension as a function of the axial position.

FIG. 5 show the distributions of the belt cord tension and carcass cord tension under 100% pressure which were obtained by a finite element method, wherein the chain line shows the distribution of the tire according to the present invention and the solid line shows a conventional tire which swells evenly. The numbers 1–9 enclosed with circles show the measuring points which are shown in FIG. 2.

As to the belt cord tension ratio Tb which is the ratio Ts/Tc between the maximum cord tension Tbs in the shoulder region Sh (between the measuring point 3 and 4) and the maximum cord tension Tbc in the crown region Cr (between the measuring points 1 and 2), FIG. 5 shows that the ratio reaches up to about 1.47 and thus the tension is effectively increased in the shoulder region, whereas the ratio of the conventional tire is about 1.1 by which ratio an increase in the shoulder rigidity can not be obtained.

As to the carcass cord tension ratio Tc which is the ratio Tcs/Tcc between the maximum cord tension Tcs in the shoulder region Sh (between the measuring points 7 and 8) and the maximum cord tension Tcc in the crown region Cr (between the measuring points 5 and 6), FIG. 5 shows that the ratio reaches up to about 3.75, whereas the ratio of the conventional tire decreases to about 0.7 which means the tension becomes lower in the shoulder region than the crown region.

The carcass cord tension ratio Tc is preferably in the range of from 2.0 to 3.8, more preferably 2.0 to 3.5. The belt cord tension ratio Tb is preferably in the range of from 1.2 to 2.0. If the ratio Tc is less than 2.0 and/or the ratio Tb is less than 1.2, the effect on increasing the rigidity of the shoulder region Sh has a tendency to decrease. If the ratio Tc is more than 3.8 and/or the ratio Tb is more than 2.0, the rigidity increases excessively in the shoulder region Sh. Therefore, as the camber angle increases, the rigidity changes abruptly to decrease the cornering stability, and a linear handling feeling can not be obtained.

The above-mentioned peculiar profile change during inflation from 10% to 100% can be obtained by vulcanizing the tire in a mold 10 having a peculiar profile.

According to the present invention, an intentional difference is provided between the profile when the tire is mounted on the standard rim R and inflated to 100% of the standard pressure, and the profile when the tire is put in a vulcanizing mold 10.

FIG. 1 shows an example of the mold 10, which is a segmental mold having a tread shaping face 10b for shaping the tread portion 2, a pair of axially opposite sidewall shaping faces 10c for shaping the sidewall portions 3, and a pair of bead shaping faces 10a for shaping the bead portions 4.

Figure 3:
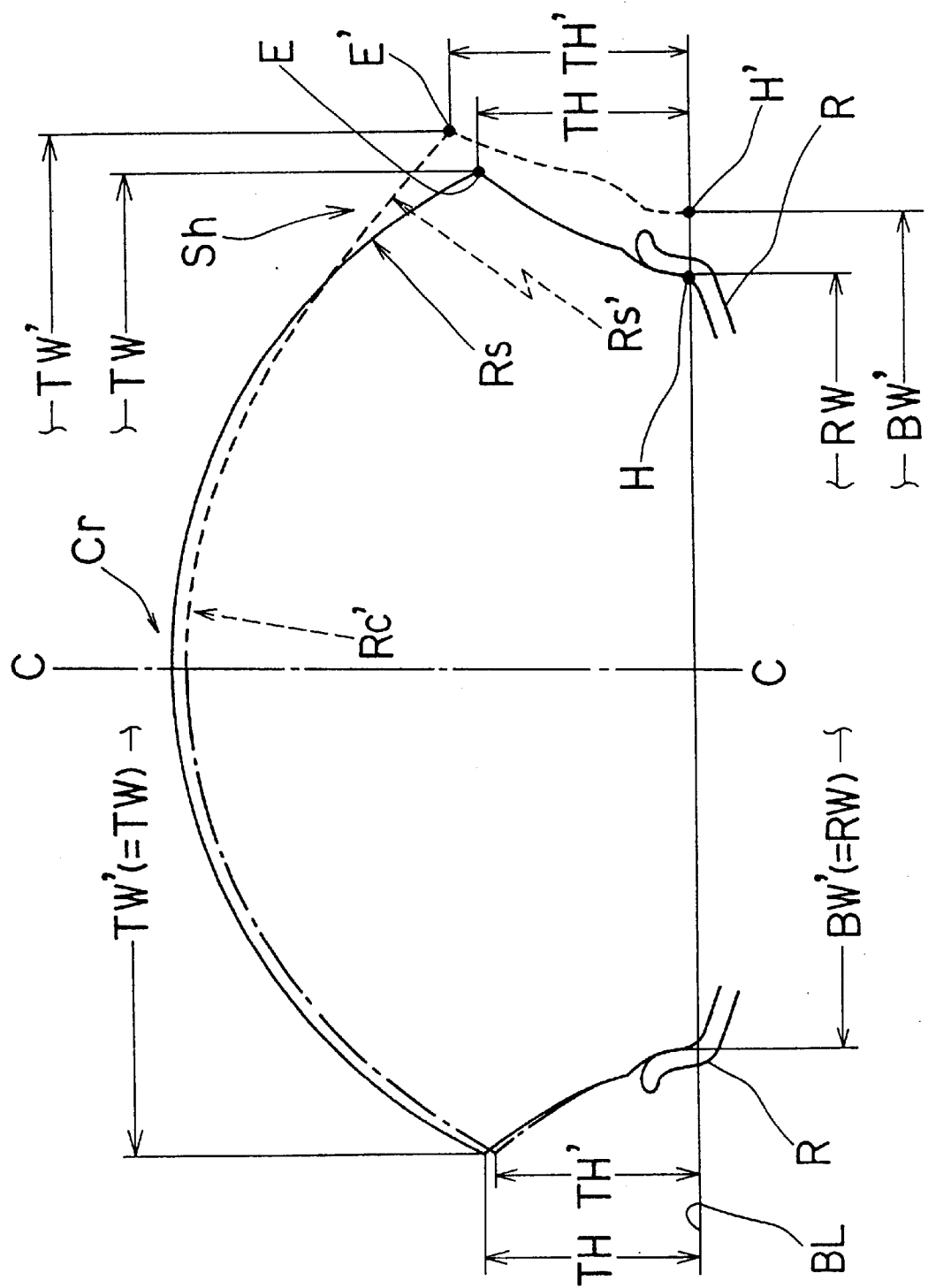
FIG. 3 shows the difference in vulcanizing profile between the present invention and prior art.

Incidentally, a tire took out from the vulcanizing mold and not mounted on a rim has substantially the same profile as in the mold. Therefore, the profile of the tire not mounted on a rim and the profile of the mold 10 are described together, referring these profiles as vulcanizing profile and the above-explained profile of the tire when mounted on the standard rim and inflated to 100% of the standard pressure as inflated profile hereinafter for convenience' sake. Thus FIG. 1 shows the vulcanizing profile and FIG. 2 shows the inflated profile. FIG. 3 shows the vulcanizing profile of the invention with a dotted line, the vulcanizing profile of a conventional tire with a chain line, and the inflated profile of these tires with a solid line.

In both of the vulcanizing and inflated profiles, the tread portion 2 is curved convexly so that the maximum section width TW lies between the tread edges E or the axial edges of the tread portion 2. Thus, the maximum section width TW of the tire is equal to the tread width.

In the vulcanizing profile:
  the bead width BW' which is the axial distance between the axially outer surfaces of the bead portions 4, and the corresponding bead clip width CW which is the axial distance between the axially inner surfaces of the bead shaping faces 10a are 15 to 45 mm (or 8 to 24% of the width TW) wider than the rim width RW of the standard rim;
  the axial width TW' between the axially outer edges E' of the tread portion 2 or the tread shaping face 10b is 5 to 25 mm (or 2 to 14% of the width TW) wider than the width TW;
  the radial height TH' of the radially outer edges E' of the sidewall portions 3 or the sidewall shaping faces 10c is 3 to 15 mm (or 1 to 8% of the width TW) higher than the radial height TH of the edge E, each measured from the bead base line BL; and
  the distance between the edge E' and the bead heel point H' is substantially the same as the distance between the edge E and the bead heel point H of the inflated profile.

In the conventional tire, the widths BW' and TW' of the vulcanizing profile are substantially equal to the rim width RW and the width TW of the inflated profile. Further, the tread edge height TH' is slightly lower than the tread edge height TH. Therefore, the shoulder region Sh is hardly deformed when the tire is mounted on a rim. When the tire is inflated to a normal pressure, the tread portion 2 swells evenly and the cord tension becomes substantially even.

In the vulcanizing profile of the present invention, the tread portion curves continuously so that the maximum section width TW' lie between the tread edges, and the bead width BW', tread width TW' and tread edge height TH' are set larger than the standard rim width RW, the tread width TW and tread edge height TH under 100% pressure, respectively as explained above. Accordingly, when the tire is mounted on a standard rim, the bead width becomes narrow, and as a result the shoulder region Sh is pulled radially inwardly. By such deformation, a large tension is produced in the shoulder region Sh and by the increase in the inner pressure thereafter the cord tension in the shoulder region Sh is further increased.

If the difference between the width BW' (=CW) and the rim width RW is less than 15 mm, the deformation of the tire in the shoulder region Sh by rim mounting becomes insufficient for increasing the cord tension. Thus the rigidity of the shoulder region Sh becomes lower. If the difference is more than 45 mm, the cord tension in the shoulder region Sh is excessively increased.

On the premise that the tire is mounted on a standard rim R, the difference of the bead width BW' from the standard rim width RW is set in the range of from 15 to 30 mm (or 8 to 17% of the width TW). However, if the tire is mounted on a rim whose rim width is a half inch larger than the standard rim, it is preferable that the bead width BW' is set in the range of from 27 to 42 mm (or [14] to 23% of the width TW) larger than the standard rim width RW. If the tire is mounted on a rim whose rim width is an inch larger than the standard rim, it is preferable that the bead width BW' is about 45 mm (or about 24% of the width TW) larger than the standard rim width RW.

That is, the bead width BW' is preferably about 1.1 to 1.35 times the rim width of the intended rim.

Further, in the vulcanizing profile, the radius of curvature Rs' of the shoulder region Sh is larger than the radius of curvature Rc' of the crown region Cr. The ratio (Rs' /Rc' ) is preferably 1.9 to 4.0.

Furthermore, the radius of curvature Rs' of the shoulder region Sh of the vulcanizing profile is preferably 2.0 to 4.0 times the radius of curvature Rs of the shoulder region Sh of the inflated profile.

In this example, the tread profile under the 100% pressure has substantially a single radius of curvature R1, which is smaller than the radius RS'.

In the present invention, the tire is made by vulcanizing a raw tire, using the mold 10 having the above-mentioned vulcanizing profile. The raw tire is put in the mold 10, and during heating the tire, the inside of the tire is pressurized by inflating a bladder inserted in the tire so as to press the outside of the tire onto the inside of the tire mold so that the tire is provided with the vulcanizing profile. As for other manufacturing processes and apparatuses, conventional processes and apparatuses can be used.

Comparison Tests

Test tires having the same internal structure shown in FIGS. 1 and 2 were made by way of test and tested for the straight running stability, cornering stability, tire rigidity, cornering grip and vertical spring coefficient. The test tires included Example tires 1 to 3 having the vulcanizing profile shown in FIG. 3 with a dotted line, and Reference tires 1 and 2 having the vulcanizing profile shown in FIG. 3 with a chain line.

The vertical spring coefficient was measured under the following conditions, changing the camber angle from 0 to 40 degrees.

Tire size: 180/55R17
Rim size: 17XMT5.50 (standard rim)
Inner pressure: 2.5 kgf/sq.cm
Tire load: 155 kgf The other performance was evaluated into five ranks by a test rider during running a 750 cc four-cycle-engine motorcycle on a dry asphalt test course.

The test tires were mounted on the rear wheel.
Tire size: 180/55R17
Rim size: 17XMT5.50 (standard rim)
Inner pressure: 2.9 kgf/sq.cm
Carcass: 1260d/2 nylon cord,
Cord count: 38/5 cm
Belt: a single ply of spiral windings of 1500d/2 aromatic polyamide cords
Cord count: 50/5 cm
Cord angle: 0 degree to the tire equator
Ply width: 205 mm On the front wheel, the same tire was used.
Tire size: 120/70R17
Rim size: 17XMT3.50
Inner pressure: 2.5 kgf/sq.cm
Carcass: 2 plies of 1260d/2 nylon cords
Cord count: 41/5 cm
Cord angle: 88 degrees to the tire equator
Belt: 2 cross plies of 1500d/2 aromatic polyamide cords
Cord count: 35/5 cm
Cord angle: 17 degrees to the tire equator The test results are shown in Table 1.

TABLE 1

| Tire | Ref. 1 | Ref. 2 | Ex. 1 | Ex. 2 | Ex. 3 |
|---|---|---|---|---|---|
| Carcass | | | | | |
| Number of ply | 1 | 2 | 1 | 2 | 1 |
| Cord angle (deg) | 90 | 88 | 90 | 88 | 90 |
| Vulcanizing profile | | | | | |
| Bead width BW' (mm) | 140 | 140 | 165 | 165 | 170 |
| Tread width TW' (mm) | 183 | 183 | 202 | 202 | 202 |
| Tread edge height TH' (mm) | 40 | 40 | 47 | 47 | 46 |
| Inflated profile | | | | | |
| Bead width BW(mm) | 140 | 140 | 140 | 140 | 140 |
| Tread width TW (mm) | 185 | 185 | 185 | 185 | 185 |
| Tread edge height TH (mm) | 45 | 45 | 45 | 45 | 44 |
| Tread radius (mm) | 100 | 100 | 100 | 100 | 100 |
| Stability | | | | | |
| Straight running | 4 | 4 | 4.3 | 4.5 | 4.4 |
| Cornering | 3.7 | 4 | 4.5 | 4.5 | 4.6 |
| Rigidity | 3.5 | 4 | 4.3 | 4.5 | 4.4 |
| Cornering grip | 3.7 | 4 | 4.5 | 4.5 | 4.6 |
| Vertical spring coefficient | | | | | |
| Camber angle 0 deg | 16.84 | 17.4 | 16.96 | 18.21 | 17.01 |
| Camber angle 20 deg | 17.16 | 19.34 | 18.93 | 20.25 | 18.96 |
| Camber angle 30 deg | 16.19 | 17.94 | 18.39 | 20.19 | 19.01 |
| Camber angle 40 deg | 17 | 18.71 | 22.29 | 24.46 | 23.42 |

From the tests, it was confirmed that Example tires were improved in the straight running stability and cornering grip in particular. Even if the camber angle became relatively large, Example tires were superior to Reference tires in the vertical spring coefficient and the rigidity of the shoulder region.

The present invention is suitably applied to a rear tire for motorcycles of which tire aspect ratio is 40 to 60%. It is however possible to apply to a front tire and a tire having an aspect ratio outside this range.

What is claimed is:

1. A motorcycle tire and rim combination comprising:

a motorcycle tire and a rim;

said motorcycle tire comprising:

a tread portion with a pair of tread edges, the tread portion curved convexly so that the maximum section width lies between the tread edges;

a pair of sidewall portions;

a pair of bead portions;

a carcass ply of cords arranged radially at an angle of 70 to 90 degrees to the tire equator;

a belt ply of at least one cord laid at an angle of 0 to 35 degrees with respect to the tire equator disposed radially outside the carcass ply in the tread portion, wherein, when the tire is mounted on said rim and inflated from 10% of a standard inner pressure to 100% thereof, the tread portion swells such that the amount of swelling is larger in a shoulder region than a crown region of the tread portion; and has a maximum at a position between the tire equator and each tread edge, an amount LS of swelling at a position spaced apart from the tire equator by ⅓ of the tread face length measured between the tread edges along the tread face being in the range of 1.5 to 3.0 times an amount LC of swelling measured at the tire equator;

the tire has a vulcanizing profile which has a bead width BW' being wider than the rim width of the rim, a tread width TW' being wider than the tread width TW under 100% of the standard pressure, a tread edge height TH' being higher than the tread edge height TH under 100% of the standard pressure, and a tread curvature being gentler than the curvature of the tread portion under 100% of the standard pressure.

2. The motorcycle tire and rim combination according to claim 1, wherein, the bead width BW' is 15 to 45 mm wider than the rim width of the rim;

the tread width TW' is 5 to 25 mm wider than the tread width TW under 100% of the standard pressure; and the tread edge height TH' is 3 to 15 mm larger than the tread edge height TH under 100% of the standard pressure.

3. The motorcycle tire and rim combination according to claim 2, wherein, when the tire is mounted on the rim and inflated to 100% of the standard pressure, a carcass cord tension Tcs in the shoulder region is 2.0 to 3.8 times a carcass cord tension Tcc in the crown region under 100% of a standard inner pressure, and a belt cord tension Tbs in the shoulder region is 1.2 to 2.0 times a belt cord tension Tbc in the crown region under 100% of a standard inner pressure.

4. The motorcycle tire and rim combination according to claim 1, wherein, when tire is on the rim and inflated, a carcass cord tension Tcs in the shoulder region is 2.0 to 3.8 times a carcass cord tension Tcc in a crown region under 100% of a standard pressure, and a belt cord tension Tbs in the shoulder region is 1.2 to 2.0 times a belt cord tension Tbc in the crown region under 100% of a standard inner pressure.

* * * * *